(12) United States Patent
Grayson

(10) Patent No.: US 7,637,231 B2
(45) Date of Patent: Dec. 29, 2009

(54) ANIMAL HALTER

(76) Inventor: George Grayson, 16 Boroughbridge Road, Northallerton, North Yorkshire, DL7 8BE (GB)

( * ) Notice: Subject to any disclaimer, the term of this patent is extended or adjusted under 35 U.S.C. 154(b) by 538 days.

(21) Appl. No.: 11/512,019

(22) Filed: Aug. 29, 2006

(65) Prior Publication Data
US 2007/0051324 A1 Mar. 8, 2007

(30) Foreign Application Priority Data
Sep. 8, 2005 (GB) ................. 0518318.1
Dec. 24, 2005 (GB) ................. 0526468.4
Apr. 12, 2006 (GB) ................. 0607361.3

(51) Int. Cl.
A01K 25/00 (2006.01)
(52) U.S. Cl. ...................... 119/831; 119/856
(58) Field of Classification Search ................. 119/831, 119/856, 858, 864; 54/71
See application file for complete search history.

(56) References Cited

U.S. PATENT DOCUMENTS

| 462,743 | A | * | 11/1891 | Sisson | 54/24 |
| 660,494 | A | * | 10/1900 | Evans | 54/24 |
| 663,108 | A | * | 12/1900 | Todd | 119/831 |
| 897,329 | A | * | 9/1908 | Weber | 54/24 |
| 977,547 | A | * | 12/1910 | Read | 119/819 |
| 1,325,061 | A | * | 12/1919 | Veal | 54/24 |
| 1,474,231 | A | * | 11/1923 | Brown | 119/831 |
| 1,800,421 | A | * | 4/1931 | Wickersham et al. | 119/863 |
| 2,187,021 | A | * | 1/1940 | Everson | 119/792 |
| 2,464,867 | A | * | 3/1949 | Johnson | 119/863 |
| 4,369,615 | A | * | 1/1983 | Bloodworth | 54/24 |
| 4,472,925 | A | * | 9/1984 | Woodruff | 54/24 |
| 4,566,255 | A | * | 1/1986 | DeGroot | 54/24 |
| 4,722,171 | A | * | 2/1988 | Meroth | 54/6.1 |
| 4,838,206 | A | * | 6/1989 | Anderson et al. | 119/831 |
| 4,941,313 | A | * | 7/1990 | Anderson et al. | 54/24 |
| 5,267,529 | A | * | 12/1993 | Zelinger | 119/831 |
| D378,150 | S | * | 2/1997 | DuBarry | D30/152 |
| 5,732,660 | A | * | 3/1998 | David et al. | 119/792 |
| 5,785,008 | A | * | 7/1998 | Liu | 119/831 |
| 5,992,352 | A | * | 11/1999 | Borchelt et al. | 119/856 |

(Continued)

FOREIGN PATENT DOCUMENTS

AU 0545616 9/1985

(Continued)

Primary Examiner—Yvonne R. Abbott
(74) Attorney, Agent, or Firm—Jack Schwartz & Associates, PLLC

(57) ABSTRACT

An animal halter 102 has a muzzle loop 104 adapted to fit over the upper and lower jaws of an animal such as a dog. The animal halter 102 also comprises a collar loop 108 for attachment around the neck of the dog. The halter 102 is formed from a single piece of fabric looped in a figure of eight configuration and threaded through forward control ring 116 and a second ring 117. Second ring 117 has a smaller diameter than forward control ring 116 to prevent the forward control ring 116 from passing through the second ring 117. When an animal to which the halter is attached pulls on the halter against a lead, rings 116 and 117 tend to lock the halter fabric therebetween such that the respective sizes of the muzzle loop 104 and collar loop 108 do not change.

18 Claims, 3 Drawing Sheets

U.S. PATENT DOCUMENTS

| | | | |
|---|---|---|---|
| D458,717 S * | 6/2002 | Mugford | D30/152 |
| 6,595,156 B1 * | 7/2003 | Curran | 119/792 |
| 6,610,023 B2 * | 8/2003 | Steponovich | 602/26 |
| D524,997 S * | 7/2006 | Franco | D30/152 |
| D552,805 S * | 10/2007 | Holt et al. | D30/152 |
| 7,441,516 B2 * | 10/2008 | Sharpe | 119/856 |
| 2002/0073936 A1 * | 6/2002 | Fields-Babineau | 119/863 |
| 2009/0000570 A1 * | 1/2009 | Ashby | 119/858 |

FOREIGN PATENT DOCUMENTS

| | | |
|---|---|---|
| BE | 514681 | 10/1952 |
| DE | 29803668 | 7/1998 |
| GB | 2373986 | 10/2002 |
| GB | 2379373 | 3/2003 |

* cited by examiner

ANIMAL HALTER

CROSS-REFERENCED TO RELATED APPLICATIONS

This is a new United States Utility Patent Application claiming priority from United Kingdom Application Serial Nos. 0518318.1 filed Sep. 9, 2005, 0526468.4 filed Dec. 24, 2005 and 0607361.3 filed Apr. 12, 2006.

FIELD OF THE INVENTION

The present invention relates to an animal halter, and relates particularly, but not exclusively, to an animal halter having a muzzle loop and collar loop in which the respective sizes of the muzzle and collar loops are adjustable. The present application also relates to an animal halter having a slidable control ring.

BACKGROUND OF THE INVENTION

Animal halters having a collar loop for encircling the neck of an animal, such as a dog or horse, and a muzzle loop for encircling the jaws of the animal are known. The collar and muzzle loops can be formed from a single piece of material in a figure of eight configuration, the respective loops being generally separated by a ring disposed between the collar and muzzle loop so that a lead can be attached to the ring. This type of halter suffers from the drawback that if the animal pulls against the lead, the material can slip through the ring and sizes of the respective muzzle and collar loops can change causing problems such as the muzzle loop riding over the animal's eyes.

EP0199477 describes a combination collar and muzzle for an animal. This product in marketed as the GENTLE LEADER (UK Trade Mark Registration No. 1367050). A collar loop is provided for encircling the neck immediately behind the ears of an animal, and a muzzle loop is provided for encircling the upper and lower jaws of the animal to form a combination collar and muzzle. The two loops are coupled together with a connecting cam type buckle disposed behind the animal's jaw. The muzzle loop is slidable in the cam buckle and also comprises a lead ring for connecting a lead to the muzzle loop. When the combination collar and muzzle is attached to an animal and pressure is applied to the lower portion of the muzzle loop by pulling on a lead, the cam buckle moves against the lower jaw of the animal. This causes pressure to be applied to the muzzle and the top of the neck of the animal in order to aid control of the animal.

The combination collar and muzzle described in EP0199477 suffers from the drawback that two pieces of fabric are required, a first piece of fabric for the collar loop and a second piece of fabric for the muzzle loop. Also, the collar and muzzle loops require a cam buckle in order to slidably connect the loops together. The relatively large number of parts required to form the combination collar and muzzle increases the cost of manufacture.

The combination collar and muzzle of EP0199477 also suffers from the drawback that due to the slidable interconnection between the muzzle loop and the collar loop, pulling by the animal can cause slippage of the muzzle loop which decreases the amount of control the owner has over the animal.

Another type of animal halter comprises a combination collar and muzzle loop, the collar loop having two leads attached, one at either side of the animal's head. Consequently, when the animal is being led and the animal pulls in either the left or right direction, the user can use the opposite lead (left or right) to control the animal. This type of animal halter suffers from the drawback that two leads are required to be attached to the collar loop, thereby increasing the number of parts required and the associated cost of manufacture.

Preferred embodiments of the present invention seek to overcome the above disadvantages of the prior art.

SUMMARY OF THE INVENTION

According to an aspect of the present invention, there is provided an animal halter comprising:

a muzzle loop adapted to be placed around an animal's jaws and a collar loop adapted to be placed around an animal's neck, wherein said muzzle and collar loops are defined by a single piece of material;

a first ring slidably threaded on to a first part of said piece of material defining part of said muzzle loop and onto a second part of said piece of material defining part of said collar loop; and a second ring adapted to cooperate with said first ring such that increasing tension in said muzzle or collar loop increases the sliding friction between said first and second parts.

This provides the advantage that the interaction between the halter material and the first and second rings prevents the animal to which the halter is attached changing the dimensions of the respective loops by pulling on the halter, since the rings tend to lock together and trap the material of the loops when the animal pulls on the halter. This also provides the advantage that the halter is less costly to manufacture since only a single piece of material is required. Furthermore, since the first ring can be connected to a standard collar by hooking a lead to both the first ring and the standard collar, this provides the advantage that if the animal to which the halter is attached backs out of the halter, then the lead will still be connected to the animal by means of the standard collar.

In a preferred embodiment, the second ring has a smaller diameter than the first ring.

This provides the advantage that the first ring is prevented from being pulled through the second ring.

The halter may further comprise a thickened portion of material adapted to prevent slippage of the material through the first and/or second rings when the halter is attached to an animal.

This provides the advantage of making it more difficult for the animal to change the respective sizes of the muzzle and collar loops.

Said thickened portion of material may be formed by looping the material back on itself and attaching the material to itself to form a third loop.

This provides the advantage that the thickened portion can be formed from the material that forms the halter such that a separate piece of material is not required, therefore reducing cost and simplifying manufacture.

In a preferred embodiment, the collar loop comprises a buckle for opening and closing the collar loop and said thickened portion of material is disposed on a portion of the collar loop.

This provides the advantage that when the collar loop is opened, a portion of the collar loop can be threaded through the muzzle loop such that the orientation of the halter is reversed. Animals can either be walked on the left or right hand side of the person walking the animal. For example, if an animal such as a dog is being walked on the right hand side of the user and the dog has a tendency to pull away to the right, then the halter can be orientated such that the thickened portion prevents the pulling of the dog from changing the dimensions of the muzzle and collar loops. Alternatively, if the dog is being walked on the left of the user, then the collar loop can be opened and rethreaded through the muzzle loop such that the orientation of the thickened portion relative to the muzzle and collar loops is reversed to prevent the dimensions of the respective loops changing when the animal pulls away to the left.

The buckle may further comprises a bar portion on to which material is slidably threaded and the halter may further comprise a slip buckle threaded onto the collar loop to permit adjustment of the size of the collar loop without adjusting the size of the muzzle loop.

The halter may further comprise a control ring slidably disposed on the collar loop, the control ring adapted to allow attachment of a lead.

By providing a control ring disposed on the collar loop, pulling on the control ring will cause the collar loop and muzzle loop to cause the animal to which the halter is attached to move its head in a nodding motion, without pulling the muzzle loop over the eyes of the animal. This provides the advantage that the animal can be pulled from the back of the head to exert control over the animal. This also provides the advantage that only a single lead is required no matter which side of the user the animal is on, since the control ring connecting the collar loop to the lead is slidable on the collar loop.

According to another aspect of the present invention, there is provided an animal halter comprising:

a muzzle loop;

a collar loop; and a control ring slidably disposed on the collar loop, the control ring adapted to allow attachment of a lead.

By providing a control ring disposed on the collar loop, pulling on the control ring will cause the collar loop and muzzle loop to cause the animal to which the halter is attached to move its head in a nodding motion, without pulling the muzzle loop over the eyes of the animal. This provides the advantage that the animal can be pulled from the back of the head to exert control over the animal. This also provides the advantage that only a single lead is required no matter which side of the user the animal is on, since the control ring connecting the collar loop to the lead is slidable on the collar loop.

In a preferred embodiment, the muzzle loop and collar loop are defined by a single piece of material.

The halter may further comprise adjustment means slidably threaded onto a first part of said piece of material defining part of said muzzle loop and onto a second part of said piece of material defining part of said collar loop for enabling the adjustment of the respective sizes of the muzzle and collar loops.

The adjustment means may comprise a slip buckle.

The adjustment means may comprise a first ring slidably threaded on to a first part of said piece of material defining part of said muzzle loop and onto a second part of said piece of material defining part of said collar loop, and a second ring adapted to cooperate with said first ring such that increasing tension in said muzzle or collar loop increases the sliding friction between said first and second parts.

This provides the advantage that the interaction between the halter material and the first and second rings prevents the animal to which the halter is attached changing the dimensions of the respective loops by pulling on the halter, since the rings tend to lock together and trap the material of the loops when the animal pulls on the halter. This also provides the advantage that the halter is less costly to manufacture since only a single piece of material is required. Furthermore, since the first ring can be connected to a standard collar by hooking a lead to both the first ring and the standard collar, this provides the advantage that if the animal to which the halter is attached backs out of the halter, then the lead will still be connected to the animal by means of the standard collar.

The second ring may have a smaller diameter than the first ring.

This provides the advantage that the first ring is prevented from being pulled through the second ring.

The halter may further comprise a thickened portion of material adapted to prevent slippage of the material through the adjustment means when the halter is attached to an animal.

This provides the advantage of making it more difficult for the animal to change the respective sizes of the muzzle and collar loops.

Said thickened portion of material may be formed by looping the material back on itself and attaching the material to itself to form a third loop.

This provides the advantage that the thickened portion can be formed from the material that forms the halter such that a separate piece of material is not required, therefore reducing cost and simplifying manufacture.

In a preferred embodiment, the collar loop comprises a buckle for opening and closing the collar loop and said thickened portion of material is disposed on a portion of the collar loop.

This provides the advantage that when the collar loop is opened, a portion of the collar loop can be threaded through the muzzle loop such that the orientation of the halter is reversed. Animals can either be walked on the left or right hand side of the person walking the animal. For example, if an animal such as a dog is being walked on the right hand side of the user and the dog has a tendency to pull away to the right, then the halter can be orientated such that the thickened portion prevents the pulling of the dog from changing the dimensions of the muzzle and collar loops. Alternatively, if the dog is being walked on the left of the user, then the collar loop can be opened and rethreaded through the muzzle loop such that the orientation of the thickened portion relative to the muzzle and collar loops is reversed to prevent the dimensions of the respective loops changing when the animal pulls away to the left.

The buckle may further comprise a bar portion on to which material is slidably threaded and the halter may further comprise a second slip buckle threaded on to the collar loop to permit adjustment of the size of the collar loop without adjusting the size of the muzzle loop.

According to a further aspect of the present invention, there is provided an animal halter comprising:

a muzzle loop and a collar loop defined by a single piece of material;

adjustment means slidably threaded onto a first part of said piece of material defining part of said muzzle loop and onto a second part of said piece of material defining part of said collar loop, the adjustment means adapted to allow adjustment of the respective sizes of the muzzle and collar loops; and a thickened portion of material adapted to prevent slippage of the muzzle loop and/or collar loop through the adjustment means when the halter is attached to an animal.

This provides the advantage of making it more difficult for the animal to change the respective sizes of the muzzle and collar loops by pulling on the halter against a lead.

The adjustment means may comprise a slip buckle.

The adjustment means may comprise a first ring slidably threaded on to a first part of said piece of material defining part of said muzzle loop and onto a second part of said piece of material defining part of said collar loop, and a second ring adapted to cooperate with said first ring such that increasing tension in said muzzle or collar loop increases the sliding friction between said first and second parts.

This provides the advantage that the interaction between the halter material and the first and second rings prevents the animal to which the halter is attached changing the dimensions of the respective loops by pulling on the halter, since the rings tend to lock together and trap the material of the loops when the animal pulls on the halter. This also provides the advantage that the halter is less costly to manufacture since only a single piece of material is required. Furthermore, since the first ring can be connected to a standard collar by hooking a lead to both the first ring and the standard collar, this provides the advantage that if the animal to which the halter is attached backs out of the halter, then the lead will still be connected to the animal by means of the standard collar.

The second ring may have a smaller diameter than the first ring.

This provides the advantage that the first ring is prevented from being pulled through the second ring.

In a preferred embodiment, the thickened portion of material is formed by looping the material back on itself and attaching the material to itself to form a third loop.

This provides the advantage that the thickened portion can be formed from the material that forms the halter such that a separate piece of material is not required, therefore reducing cost and simplifying manufacture.

The collar loop may comprise a buckle for opening and closing the collar loop, and said thickened portion of material may be disposed on a portion of the collar loop.

This provides the advantage that when the collar loop is opened, a portion of the collar loop can be threaded through the muzzle loop such that the orientation of the halter is reversed. Animals can either be walked on the left or right hand side of the person walking the animal. For example, if an animal such as a dog is being walked on the right hand side of the user and the dog has a tendency to pull away to the right, then the halter can be orientated such that the thickened portion prevents the pulling of the dog from changing the dimensions of the muzzle and collar loops. Alternatively, if the dog is being walked on the left of the user, then the collar loop can be opened and rethreaded through the muzzle loop such that the orientation of the thickened portion relative to the muzzle and collar loops is reversed to prevent the dimensions of the respective loops changing when the animal pulls away to the left.

The buckle may further comprise a bar portion on to which material is slidably threaded and the halter may further comprise a second slip buckle threaded onto the collar loop to permit adjustment of the size of the collar loop without adjusting the size of the muzzle loop.

In a preferred embodiment, the halter further comprises a control ring slidably disposed on the collar loop, the control ring adapted to allow attachment of a lead.

By providing a control ring disposed on the collar loop, pulling on the control ring will cause the collar loop and muzzle loop to cause the animal to which the halter is attached to move its head in a nodding motion, without pulling the muzzle loop over the eyes of the animal. This provides the advantage that the animal can be pulled from the back of the head to exert control over the animal. This also provides the advantage that only a single lead is required no matter which side of the user the animal is on, since the control ring connecting the collar loop to the lead is slidable on the collar loop.

BRIEF DESCRIPTION OF THE DRAWINGS

Preferred embodiments of the present invention will now be described, by way of example only and not in any limitative sense, with reference to the accompanying drawings in which.

DETAILED DESCRIPTION OF THE INVENTION

Figure 1:
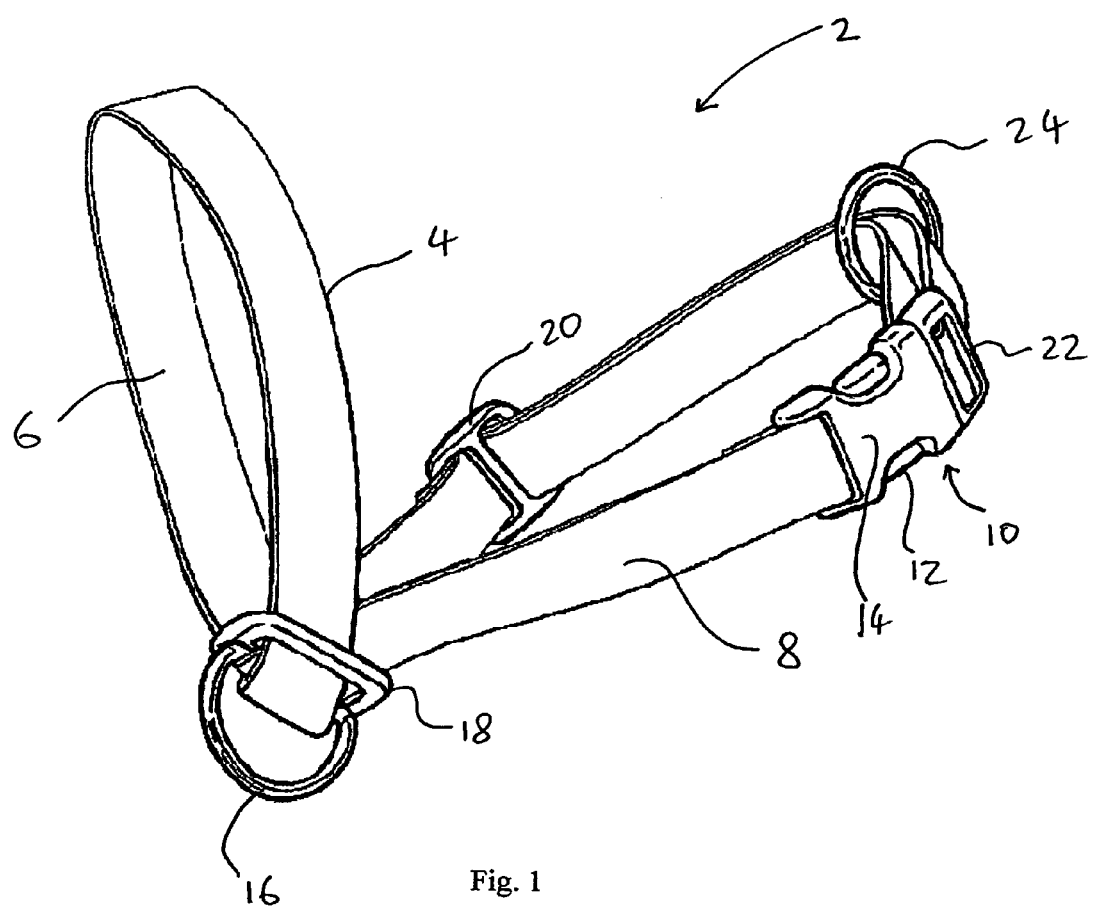
FIG. 1 is a perspective view of an animal halter of a first embodiment of the present invention.

Referring to FIG. 1, an animal halter 2 suitable for use on animals such as a dog comprises a muzzle loop 4 for placing around the jaws of the dog, the muzzle loop 4 having a nose portion 6 adapted to pass over the nose of the dog. A collar loop 8 is provided for attachment around the neck of a dog. A squeeze buckle 10 comprising a male portion 12 and a female portion 14 allows the collar loop 8 to be opened such that the animal halter 2 can be attached to the dog. It will be apparent to persons skilled in the art that buckles other than squeeze buckles could also be used.

The muzzle loop 4 and collar loop 8 are formed from a single length of fabric looped in a figure of eight configuration and threaded through a forward control ring 16 and a first three bar slip buckle 18. Materials such as nylon, polypropylene or cotton can be used for the fabric having a width of between 10 mm to 20 mm depending on the size of the halter 2, since the halter 2 can be manufactured in different sizes to suit different sizes of dog.

The combination of the forward control ring 16 and the first three bar slip buckle 18 allows the size of the muzzle loop 4 and the collar loop 8 to be adjusted by threading the fabric through the respective loops. A second three bar slip buckle 20 in combination with a slip buckle portion 22 disposed on the male portion 12 of the squeeze buckle 10 allows independent adjustment of the collar loop size without adjusting the size of the muzzle loop 4.

The size of muzzle loop 4 can be adjusted to be either in a loose configuration around the jaws of a dog such that the dog can pant and drink, or can be tightened to act as a muzzle to close the jaws of the dog if required for dogs with aggressive behaviour.

A rear control ring 24 is slidably disposed on the collar loop 8 such that a lead can be attached to the rear control ring 24 to control a dog from behind its neck. Pulling on rear control ring 24 tends to cause the dog to which the halter 2 is mounted to move its head in a nodding motion without pulling the muzzle loop 4 over the eyes of the dog, which can be used to prevent and teach the dog from pulling against the lead. A lead can also be attached to the forward control ring 16 to lead the dog in the conventional manner. As a result of the halter 2 having two control rings 16 and 24, a double hooked training lead can be used or two training leads can be attached to the halter 2 to double the amount of control a user has over the dog.

Figure 2:
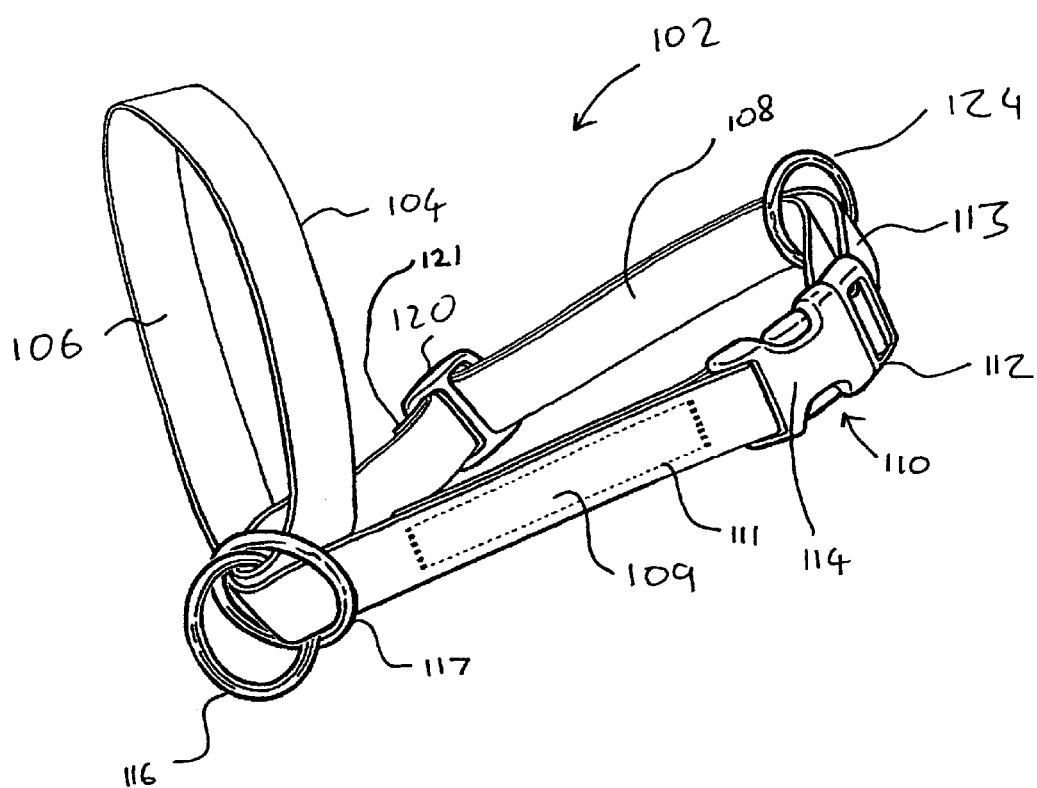
FIG. 2 is a perspective view of an animal halter of a second embodiment of the present invention.
Figure 3:
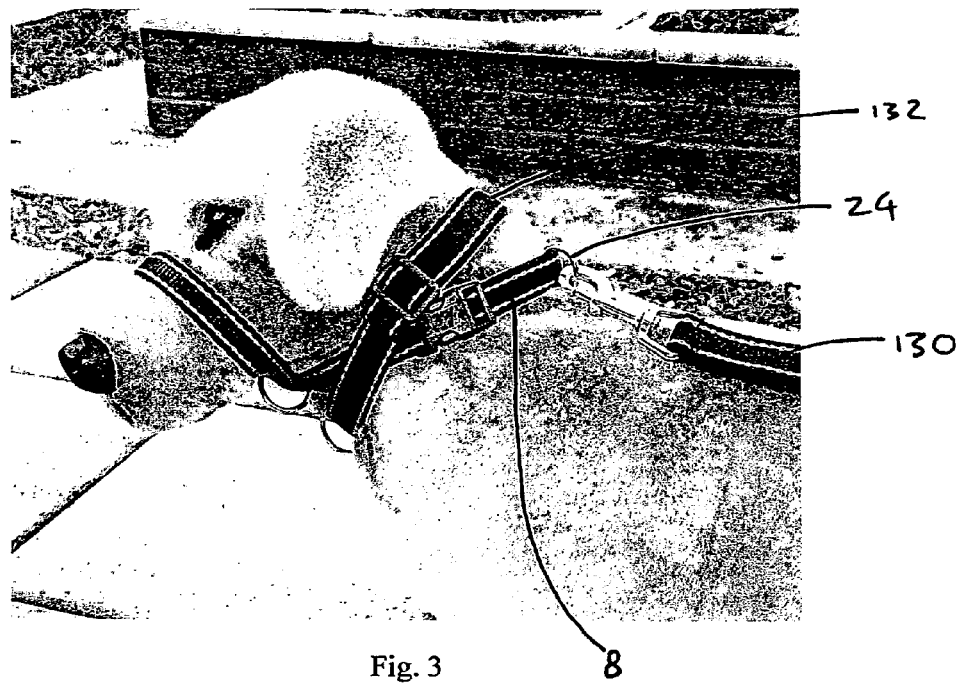
FIG. 3 is a side view of an animal halter of FIG. 1 attached to a dog, with a lead attached to the rear control ring.
Figure 4:
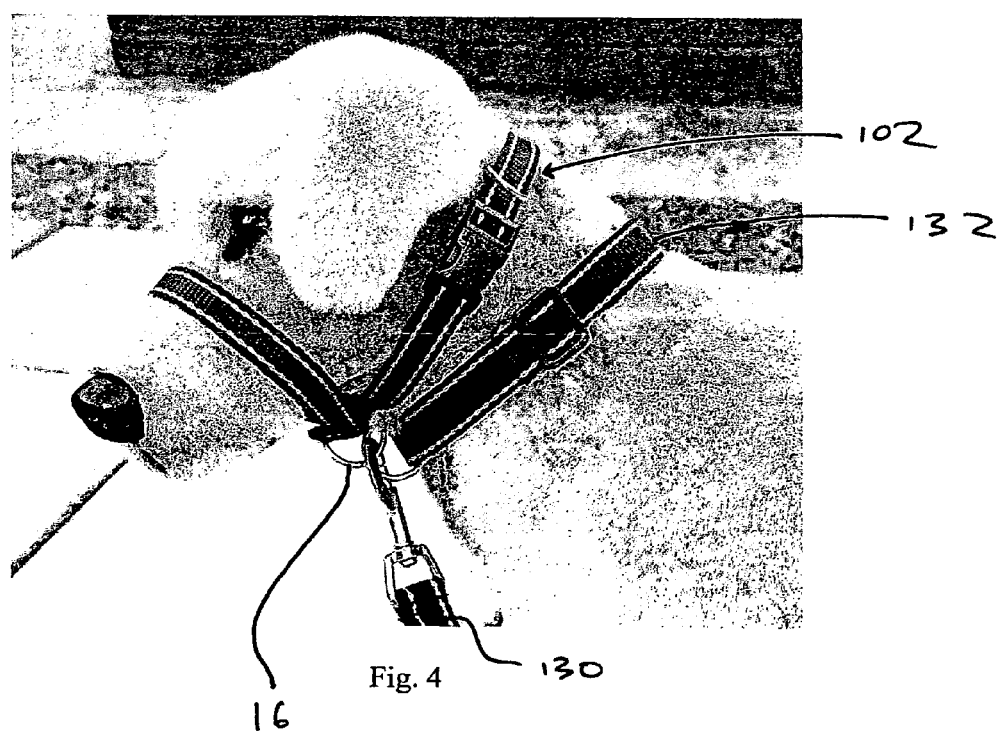
FIG. 4 is a side view of an animal halter of FIG. 1 attached to a dog with a lead attached to the forward control ring and also attached to the ring of a standard collar.

An animal halter of a second embodiment of the invention is shown in FIGS. 2 to 4, with parts common to the embodiment of FIG. 1 denoted by like reference numerals but increased by 100.

Referring to FIG. 2, an animal halter 102 has a muzzle loop 104 having a nose portion 106 adapted to fit over the upper and lower jaws of an animal such as a dog. The animal halter 102 also comprises a collar loop 108 for attachment around the neck of the dog. A squeeze buckle 110 is provided to allow the collar loop to be opened and closed to fit the halter 102 to the dog.

The halter 102 is formed from a single piece of fabric looped in a figure of eight configuration and threaded through forward control ring 116 and a second ring 117. Second ring 117 has a smaller diameter than forward control ring 116 to prevent the forward control ring 116 from passing through the second ring 117. Materials such as nylon, polypropylene or cotton can be used for the fabric having a width of between 10 mm to 20 mm depending on the size of the halter 102, since the halter 102 can be manufactured in different sizes to suit different sizes of dog. Different sizes of rings 116 and 117 can also be manufactured to suit different sizes of fabric.

When a dog pulls on halter 102 against a lead (not shown) second ring 117 and the forward control ring 116 tend to lock the halter fabric therebetween increasing the sliding friction between the muzzle loop 104 and collar loop 108 so that the respective sizes of the muzzle loop 104 and collar loop 108 remain the same.

A thickened portion 109 of the collar loop 108 is formed by looping the fabric of the collar loop 108 back on itself and attaching the looped fabric by means of stitching 111. Alternatively, glue or heat bonding could be used in place of stitching 111. The thickened portion also helps to prevent the animal to which the halter is attached from pulling on the halter and pulling the thickened portion 109 through the second ring 117.

To form the halter 102, a strip of fabric is threaded through the female portion 114 of squeeze buckle 110 and then stitched to itself at stitching 111. The fabric is then passed through second ring 117 and forward control ring 116 and then passed through second ring 117 again to thread the forward control ring 116. The fabric is then looped in a figure of eight configuration through rings 116 and 117. Rear control ring 124 and second three bar slip buckle 120 are then threaded onto the fabric. The fabric is then threaded through the male portion 112 of the squeeze buckle 110 and looped back through second three bar slip buckle 120. The fabric is finally folded over on itself to provide a second thickened portion 121 to prevent the fabric slipping out of second three bar slip buckle 20.

An animal to which the halter is attached, such as a dog can be walked on either the left or right hand side of the person walking the dog. In the configuration shown in FIG. 2, the thickened portion 109 is positioned such that a dog being walked on the left of the user would be prevented from pulling the thickened portion 109 through second ring 117.

If the dog is required to be walked on the right of the user, the squeeze buckle 110 can be opened and upper portion 113 of collar loop 108 can be passed through muzzle loop 104. The halter can then be attached to a dog and squeeze buckle 110 closed. This reverses the orientation of the thickened portion 109 with respect to the muzzle loop 104 and prevents a dog being walked on the right hand side from pulling the thickened portion 109 through second ring 117 and therefore changing the size of muzzle loop 104.

Referring to FIG. 3, animal halter 2 is shown attached to a dog. A lead 130 is hooked onto rear control ring 24. A standard collar 132 is also attached to the dog. With the lead 130 in this configuration, the halter 2 can be used to train a dog not to pull on the lead 130, since pulling on rear control ring 24 tends to put pressure on the nose of the dog and causes the head of the dog to move in a nodding motion which allows the person holding the lead to control the head of the dog. Since the rear control ring 24 is slidable on the collar loop 8 irrespective of on which side of the person holding the lead the dog is being walked, pulling on the lead 130 will exert pressure on the nose of the dog. This means that the halter 2 can be used with only a single lead in the rear configuration rather than two leads, one for each side of the head of the dog.

Referring to FIG. 4, lead 130 is attached to forward control ring 16 and the ring of a standard collar 132. This allows the halter 2 to be used in a standard leading configuration, which means that the halter 2 can be placed on a dog to allow the dog to get used to the halter. The standard collar 132 is used for safety since if the halter 2 is placed loosely on the dog then the dog may be able to back its head out of the halter 2. It can therefore be seen that the halter 2 can be used with a standard dog collar without any further parts necessary to interconnect the halter 2 to the collar 132.

The configuration of FIG. 4 is also useful for getting a dog accustomed to the halter 2, since the halter 2 can be fitted to the dog and the dog can be lead and turned from the head.

As a result of the halter 2 having two control rings 16 and 24, a double hooked training lead can be used or two training leads can be attached to the halter 2 to double the amount of control a user has over the dog.

It will be appreciated by persons skilled in the art that the above embodiments have been described by way of example only and not in any limitative sense, and that various alterations and modifications are possible without departure from the scope of the invention as defined by the appended claims. In particular, the features of the embodiments described can be interchanged, for example thickened portion 109 can also be provided on the first embodiment. Also, the halter described can be used on animals other than dogs that can be controlled with leads, such as horses.

I claim:

1. An animal halter comprising:
   a muzzle loop adapted to be placed around an animal's jaws and a collar loop adapted to be placed around an animal's neck, wherein said muzzle and collar loops are defined by a single piece of material;
   a first ring slidably threaded on to a first part of said piece of material defining part of said muzzle loop and onto a second part of said piece of material defining part of said collar loop; and
   a second ring adapted to cooperate with said first ring such that increasing tension in said muzzle or collar loop increases the sliding friction between said first and second parts.

2. A halter according to claim 1, wherein the second ring has a smaller diameter than the first ring.

3. A halter according to claim 1, further comprising a thickened portion of material adapted to prevent slippage of the material through at least one of the first and second rings when the halter is attached to an animal.

4. A halter according to claim 3, wherein said thickened portion of material is formed by looping the material back on itself and attaching the material to itself to form a third loop.

5. A halter according to claim 3, wherein the collar loop comprises a buckle for opening and closing the collar loop, and wherein said thickened portion of material is disposed on a portion of the collar loop.

6. A halter according to claim 5, wherein the buckle further comprises a bar portion on to which material is slidably threaded and the halter further comprises a slip buckle threaded onto the collar loop to permit adjustment of the size of the collar loop without adjusting the size of the muzzle loop.

7. A halter according to claim 1, further comprising a control ring slidably disposed on the collar loop, the control ring adapted to allow attachment of a lead.

8. An animal halter comprising:
  a muzzle loop and a collar loop defined by a single piece of material;
  a slip buckle slidably threaded onto a first part of said piece of material defining part of said muzzle loop and onto a second part of said piece of material defining part of said collar loop, the slip buckle adapted to allow adjustment of the respective sizes of the muzzle and collar loops; and
  a thickened portion of material adapted to prevent slippage of at least one of the muzzle loop and the collar loop through the slip buckle when the halter is attached to an animal.

9. A halter according to claim 8, wherein said thickened portion of material is formed by looping the material back on itself and attaching the material to itself to form a third loop.

10. A halter according to claim 8, wherein the collar loop comprises a buckle for opening and closing the collar loop, and wherein said thickened portion of material is disposed on a portion of the collar loop.

11. A halter according to claim 10, wherein the buckle further comprises a bar portion on to which material is slidably threaded and the halter further comprises a second slip buckle threaded on to the collar loop to permit adjustment of the size of the collar loop without adjusting the size of the muzzle loop.

12. A halter according to claim 8, further comprising a control ring slidably disposed on the collar loop, the control ring adapted to allow attachment of a lead.

13. An animal halter comprising:
  a muzzle loop and a collar loop defined by a single piece of material;
  a first ring slidably threaded on to a first part of said piece of material defining part of said muzzle loop and onto a second part of said piece of material defining part of said collar loop, and a second ring adapted to cooperate with said first ring such that increasing tension in said muzzle or collar loop increases the sliding friction between said first and second parts, wherein the first and second rings are adapted to allow adjustment of the respective sizes of the muzzle and collar loops; and
  a thickened portion of material adapted to prevent slippage of at least one of the muzzle loop and the collar loop through the first and second rings when the halter is attached to an animal.

14. A halter according to claim 13, wherein the second ring has a smaller diameter than the first ring.

15. A halter according to claim 13, wherein said thickened portion of material is formed by looping the material back on itself and attaching the material to itself to form a third loop.

16. A halter according to claim 13, wherein the collar loop comprises a buckle for opening and closing the collar loop, and wherein said thickened portion of material is disposed on a portion of the collar loop.

17. A halter according to claim 16, wherein the buckle further comprises a bar portion on to which material is slidably threaded and the halter further comprises a slip buckle threaded on to the collar loop to permit adjustment of the size of the collar loop without adjusting the size of the muzzle loop.

18. A halter according to claim 13, further comprising a control ring slidably disposed on the collar loop, the control ring adapted to allow attachment of a lead.

* * * * *